United States Patent [19]

Hayden et al.

[11] 3,764,975

[45] Oct. 9, 1973

[54] VEHICLE SPEED RESPONSIVE CONTROL AND SIGNAL DEVICE

[75] Inventors: Rodney Hayden, Stoney Creek, Ontario; Mario Guarasci, Niagara Falls, Ontario, both of Canada

[73] Assignee: TRW Inc., Cleveland, Ohio

[22] Filed: May 30, 1972

[21] Appl. No.: 257,570

[52] U.S. Cl. .................................. 340/62, 340/263
[51] Int. Cl. ............................................. B60q 1/54
[58] Field of Search ........................ 340/53, 62, 263

[56] References Cited
UNITED STATES PATENTS
3,647,016  3/1972  Fitzsimmons ................. 340/53 UX
2,769,949  3/1954  Stratton ........................ 340/263 UX
2,734,161  2/1956  Fryklund ...................... 340/263 UX Primary Examiner—Alvin H. Waring
Attorney—Philip E. Parker et al.

[57] ABSTRACT

A control device for controlling the ignition timing of a vehicle is activated when the vehicle reaches a first predetermined speed and is retained in activated condition until the vehicle de-accelerates to a second lower predetermined speed. A frequency signal generator operated by the speedometer cable feeds a signal frequency proportional to the vehicle speed to a pair of bandpass switch devices respectively adapted to pass signals representative of the first and second predetermined speeds, the first channel including a normally open switch adapted to be closed by the passed signal and to be maintained closed until activated by a passed signal from the second channel closing a second normally open switch. In two embodiments, means for maintaining the switch of the first channel closed respectively comprise a relay switch having a pair of windings in opposed or bucking relationship and a bipolar condenser initially charged by the first passed signal and subsequently effectively shorted by the second passed signal.

6 Claims, 5 Drawing Figures

VEHICLE SPEED RESPONSIVE CONTROL AND SIGNAL DEVICE

This invention relates to a speed responsive control device for automotive use adapted for controlling functions such as engine functions, warning light functions and the like.

There is a growing demand in the specifications for automobiles, particularly as manufactured and sold in North America, for the control of engine emissions, signal lights and other functions responsive to the automobile accelerating to a speed above a particular predetermined speed and responsive to the automobile de-accelerating to a speed below another predetermined speed.

For example, at low speeds engine emissions can be controlled at a particular spark advance or timing setting which it is desirable to maintain for general city traffic conditions up to, say, 30 miles per hour and above which a different spark setting or timing is required in order to control emissions. Under a de-accelerating condition it may be desirable to change to a low speed spark advance timing setting at speeds below, say, 20 miles per hour. Likewise, other speed responsive controls may be required as, for example, an exterior light indicator, such as on the roof of an automobile, which will indicate when the speed of the automobile exceeds 85 miles per hour but which would be maintained in the on position until the automobile de-accelerated to a speed below seventy-five miles per hour.

There are other useful applications of speed control to automotive functions which may be accomplished with the device of the invention which, in turn, depends upon a speed responsive electrical signal obtained from any one of a number of known devices adapted to generate an electrical signal in which the amplitude of the current or voltage or the frequency of said signal is responsive to the speed of the automobile. Such devices comprise rotary type electrical generators of forms driven by the conventional speedometer cable of the automobile, that is to say, driven by the main drive shaft of the automobile in a conventional location in the transmission.

Such electrical signal generators which are of special interest to this invention provide voltage pulses at a frequency proportional to speed so that each mile per hour of speed represents a frequency increment of, say, 30 cycles per second, whereby the speed responsive frequency signals would be 600 cycles for twenty miles per hour, 900 cycles for thirty miles per hour, 2250 cycles for seventy-five miles per hour and 2550 cycles for eighty-five miles per hour.

It is the main object of the present invention to provide a speed responsive control device adapted to generate an electrical control signal to energize a load responsive to an electrical speed signal of predetermined value and to discontinue said control signal responsive to a predetermined lesser value of said speed signal.

It is another object of the present invention to provide a speed responsive control device as set forth herein and adapted to be fabricated from relay type electrical switching components or, in the alternative, solid state electronic switching components of generally similar electrical circuit function.

It is a further object of the invention to provide a speed responsive control signal generating device actuable by an electrical signal generated at a frequency responsive to the speed of the automobiles and in which the control device accepts signals for its actuation which are of a frequency within a predetermined frequency range thus to actuate same responsive to a particular speed.

It is a still further object of the invention to provide a plurality of control devices according to the invention, each of which is adapted to generate a different control signal responsive to a different predetermined speed achieved by the automobile.

Other objects of the invention will be appreciated by a study of the following specification taken in conjunction with the accompanying drawings:

DESCRIPTION OF THE PREFERRED EMBODIMENT

Figure 2:
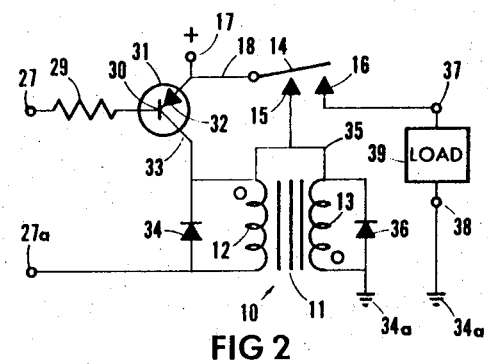
FIG. 2 is an electrical schematic of a relay switch type circuit arrangement of the speed responsive control device of the invention.
Figure 1:
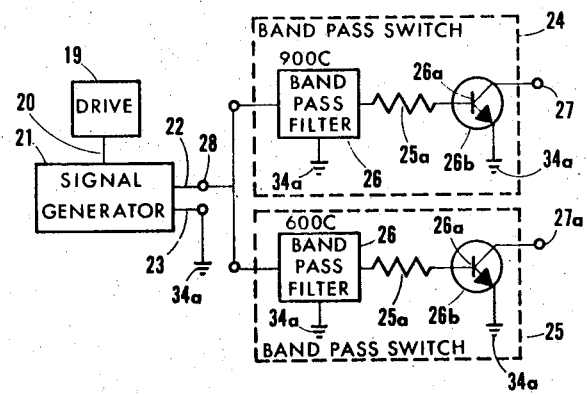
FIG. 1 is a schematic of a device for generating two separate electronic signals each responsive to a predetermined speed of an automobile.

One preferred form of the invention embodying relay type components is illustrated in FIGS. 1 and 2 wherein normally open double pole single throw relay 10 comprises a core 11 having opposed windings 12 and 13 thereon, connected so that winding 12 is in electrical circuit bucking winding or opposed relationship to winding 13 as will be further evident hereinafter. The relay 10 embodies a relay armature 14 shown in the normally open position relative to contacts 15, 16 thereof, adapted both to be connected by armature 14 to a source 17 of battery voltage through connecting line 18.

As shown in FIG. 1, an automobile transmission drive 19, causing rotation of a speedometer cable shaft 20 or the like, effects rotation of a frequency signal generator 21 communicating a frequency signal through its signal lines 22, 23 to bandpass switch units 24, 25 having input terminals 28. Each of the switch units comprises a frequency bandpass filter 26 feeding the passed signal through resistance 25a to base 26a of switching NPN transistor 26b having a grounded emitter and a collector connected to ground through NPN transistor 26b when the latter is energized by a signal pulse on base 26a. While the drive device 19, shaft 20 and frequency signal generator 21 may be regarded as known components, it is to be understood that the control device of the invention essentially begins with the input terminals 28 to which the frequency signal from the signal generator 21 is connected.

The bandpass switch devices 25, 25 are of independent bandpass frequency characteristic, each of the bandpass filter networks 26 being of conventional design and component arrangement of any one of a number of well-known forms and preferably of conventional solid state type, adapted to pass signal frequencies within a frequency band of, say, ten cycles on either side of a frequency of, say, 900 cycles. Thus, bandpass switch device 24 may have its filter 26 designed to pass 900 cycles per second corresponding to, say, 30 miles per hour and device 25 may have its filter 26 designed to pass 600 cycles per second for a 20 mile per hour signal. Terminal 27 of device 24 connects the signal passing through resistor 29 to the base 30 of the PNP transistor 31 (FIG. 2). The emitter 32 of transistor 31 is connected to battery terminal 17 of relay armature 14. The collector 33 is connected to terminal 27a of bandpass switch device 25 through relay winding 12 having a transient suppressing diode 34 in parallel therewith and connects to opposed relay winding 13 by line 35 connecting winding 13 between relay contact 15 and ground 34a in parallel with transient suppressing diode 36. Relay contact 16 connects to one terminal 37, the other load terminal 38 connecting to chassis ground 34a, said terminals serving load 39.

In operation, the control signal device of FIGS. 1 and 2 on receiving an actuating signal from signal generator 21 of less than 600 cycles per second in the example given, will not be activated because of the blocking action of the bandpass switch devices 24, 25. As soon as the automobile accelerates to a speed of twenty miles per hour (600 cycles per second), the pulse frequency signal from generator 21 will proceed through the filter 26 of switch device 25 to energize transistor 26b thereby grounding terminal 27a of bandpass switch 25. Since relay armature 14 is in the open position and transistor 31 is non-conducting, winding 12 of relay 10 is not energized. As acceleration increases past 20.5 miles per hour approximately, transistor 26b of bandpass switch 25 becomes non-conducting and the speed of the automobile may increase to thirty miles per hour (900 cycles per second). At this point, the pulse frequency signal will proceed through the filter 26 of bandpass switch 24, energizing its transistor 26b and connecting its terminal 27 to ground whereby transistor 31 becomes conducting and current from battery terminal 17 passes through coil 13 to chassis ground by way of coil leads 35 to contact 15 to cause armature 14 to close on contacts 15, 16 connecting the latter with battery terminal 17 and output terminal 37 serving the output load 39 connected between the output and load terminals 37, 38.

Above 30.5 miles per hour transistor 26b of bandpass switch 24 becomes non-conducting but relay armature 14 is held in by the circuit 17, 18, 14, 15, 35 and 13 to ground until speed is reduced to a value at which the transistor 26b of bandpass switch 25 becomes conducting (at twenty miles per hour) and its terminal 27a is grounded thus to cause winding 12 to be energized in opposition or bucking relationship to winding 13, thereby causing release and opening of relay armature 14.

In the solid state electronic circuit 40 of FIG. 3 having two terminals 27, 27a corresponding to terminals 27, 27a of FIG. 2, it being understood that the terminals 27 and 27a in FIG. 3 act as switching terminals of bandpass switches 24, 25 in the same manner as described with reference to FIGS. 1 and 2, the higher speed or frequency section 41 of circuit device 40 is actuated by a higher speed actuated switch function in switch 24 than that in switch 25 for the lower section 42. The upper and lower sections are similar and each comprises an input resistor 43, 43a connecting to base 44, 44a of PNP transistor 45, 45a, the emitter 46, 46a connects by voltage dividing resistors 49, 49a and 50, 50a respectively to chassis ground 51. The juncture 52, 52a between the voltage dividing resistors is in turn connected to the gate 53, 53a of silicon rectifier (SCR) 54, 54a having a grounded cathode 55, 55a and an anode 56, 56a, the anode 56 of SCR 54 connecting to load terminal 57 connecting to load 59. The other load terminal 58 connects by line 60 to battery source 47, and anode 56a of SCR 54a also connects through resistor 61 to positive battery source 47. Also anodes 56, 56a are interconnected by resistor 62 in series with bipolar condenser 63.

Figures 3, 5:
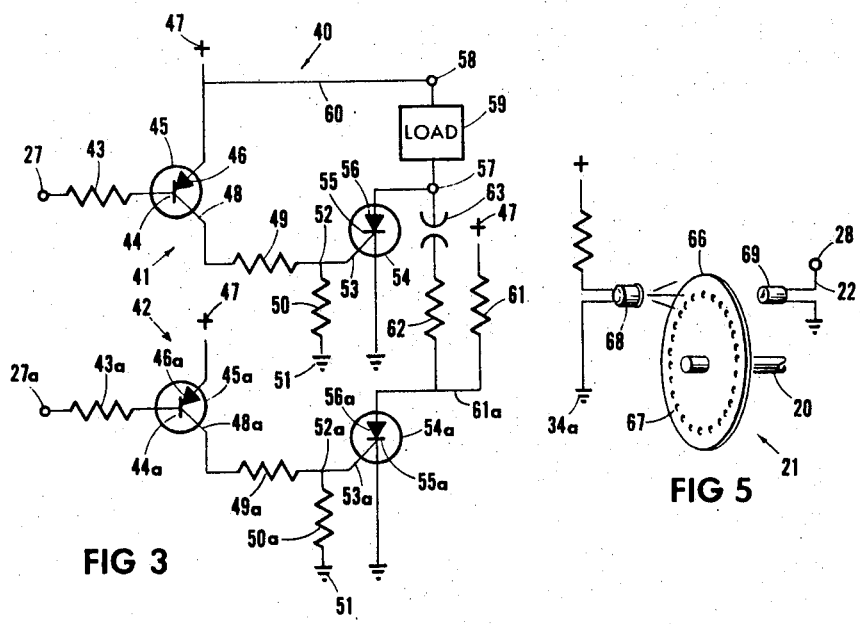
FIG. 3 is an electronic schematic of a solid state type speed control device of the invention.
FIG. 5 is a perspective diagram of a typical apparatus for generating an electrical signal having a frequency responsive to the speed of an automobile.

In the operation of the circuit control device of FIG. 3, a signal through bandpass switch 25 connecting terminal 27a to ground in the lower section 42 will render transistor 45a conducting, in turn applying current on SCR 54a and charging bipolar condenser 63 through circuit 47, 60, 58, 59, 57, 63, 62 and 54a to ground 51. At this point no current can pass through load 59 from battery terminal 47 because SCR 54 is non-conducting. As the speed of the automobile exceeds 20.5 miles per hour bandpass switch 25 effectively opens and as the speed reaches another predetermined higher speed, such as 30 miles per hour, bandpass switch 24 is activated to connect its terminal 27 to ground, thus causing transistor 45 to become conducting thereby connecting battery voltage from source 47 therethrough to voltage dividing resistors 49, 50 and current from juncture 52 to gate 53 of SCR 54 rendering the latter conducting, thus permitting current from terminal 58 to pass through load 59 and terminal 57 and SCR 54 to cathode ground, thereby discharging condenser 63. Bipolar condenser 63 discharges across SCR 54 shutting off SCR 54a. Condenser 63 now becomes charged to opposite polarity through circuit 47, 61, 61a, 62, 63, 57 and 54 to ground 51.

Thus as the speed of the automobile changes from a value above 30 miles per hour by de-acceleration to 30 miles per hour, transistor 45 will become momentarily conducting as the speed passes through this speed range to lower values. SCR 54 will, however, remain conducting until, at a speed of twenty miles per hour, bandpass switch 25 effects a grounding of base terminal 27a rendering transistor 45a conducting, whereupon voltage from juncture 52a on SCR 54a renders the latter conducting enabling discharge of condenser 63 through this SCR to grounded cathode 55a thus shorting out or effectively grounding anode 56 of SCR 54 to sever the connection of the load 59 to ground.

It will be evident that there is a common function in the circuitry of FIG. 2 as compared with the circuitry of FIG. 3. There is an upper circuit channel and a lower circuit channel in each of which the lower circuit channel at a lower predetermined speed is grounded at a particular speed by a frequency or speed responsive switch. However, the lower circuit is non-conducting relative to the load in both circuits even when energized, but merely serves to disconnect the upper circuit or load circuit when the upper circuit is energized. Thus the lower circuit has the sole function of acting as a disconnect for the load when the latter is energized under circumstances of decreasing speed through the predetermined lower speed. The upper active or load energizing circuit in both cases passes a pulse at a predetermined speed which sets up a self-holding switch device or circuit; this in the case of FIG. 2 causes the relay to close and the relay is self-holding. In the case of FIG. 3 the SCR 54 is gated to conduction and by virtue of this SCR characteristic remains conducting for current through the load until a disconnect is achieved at a lower speed in the manner described. The disconnect of FIG. 2 is achieved by the bucking or opposing relationship of coils 12 and 13 by pulsing of coil 12 whereas in the circuit of FIG. 3 the anode 56 of SCR 54 is shorted to ground through bipolar condenser 63 and SCR 54a.

Figure 4:
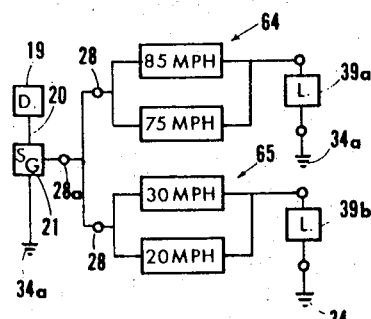
FIG. 4 is a general schematic of two speed control devices of the invention adapted to control two separate control loads, one operative at 30 miles per hour and another operative at, say, 85 miles per hour.

In FIG. 4 drive 19 signal generator 21 by shaft 20 causes a frequency signal to be connected to terminal 28a serving terminals 28, 28 of control devices 64, 65 serving different output load control devices 39a, 39b. The device 64 is indicated as being adapted to energize load 39a when the automobile reaches a speed of 85 miles per hour whereupon load 39a being energized may, for example, cause the throttle spark or choke control device to reduce engine speed. The automobile, upon slowing to 75 miles per hour, would cause load 39a to be de-energized by control device 64. Control device 65, however, may be used for emission control regulated by load 39b which, when energized, advances the spark control of the engine.

One form of signal generator useful in the invention is indicated in FIG. 5 in which the speedometer shaft 20 being used as a drive shaft effects rotation of apertured disc 66 of signal generator 21, the said disc having a plurality of apertures 67 located between the light emitting diode 68 and a light sensitive transistor 69 supported in the path of light passing through an aperture of said disc from the light emitting diode and adapted to develop a voltage pulse in line 22 at terminal 28, the frequency of said pulses being responsive to the speed of the automobile represented by the rotational speed of the speedometer shaft or cable 20.

The particular form of signal generator is not important to the invention so long as same generates a frequency signal proportional to the speed of the automobile.

From the foregoing it will be apparent that the invention whereby expressed by a relay type of circuit device as in FIG. 2 or by solid state components as in FIG. 3 is useful for controlling automobile functions or the like by energizing a load responsive to a predetermined frequency of an electrical signal generated by a device such as the device of FIG. 5 so that the frequency corresponds to a suitable multiple of the miles per hour speed of the automobile. The device is responsive on the one hand to energize the load and on the other hand de-energizes the load responsive to a signal of lower predetermined frequency. This is accomplished by a combination of a first circuit channel for energizing said load and having a normally open switch adapted to be closed responsive to said predetermined frequency; means for maintaining said load energized upon subsequent opening of said first channel switch; a second circuit channel having a normally open switch adapted to be closed responsive to said lower frequency signal; and means connecting said second circuit channel to said maintaining means to de-energize the latter upon closure of said switch of said second channel responsive to said lower frequency signal.

In a more detailed aspect it will be further apparent that the invention as described concerns a speed responsive control device comprising a first circuit channel in the form of a normally open frequency bandpass switch device adapted to be closed electrically at said predetermined frequency and a normally non-conducting transistor comprising an emitter and a collector connected in series between a positive source of battery voltage and chassis ground and having a base connected to said normally open frequency bandpass switch. A first normally open circuit element for connecting said load is between said positive source of voltage and chassis ground and means for closing said circuit element responsive to conduction of said transistor are provided by closure of said bandpass switch. Means are provided for maintaining said load energized between said source and chassis ground upon opening of said frequency bandpass switch responsive to a frequency different from said predetermined frequency. A second circuit channel in the form of a normally open frequency bandpass switch device is adapted to close responsive to said signal of lower frequency and a normally non-conducting circuit element for said second channel is rendered conducting by closure of said second frequency bandpass switch device. Means connecting said second circuit element to said first circuit element to effect opening of said first circuit element and de-energizing of the load is responsive to the said second frequency switch upon closure of the latter responsive to said lower frequency signal.

With reference to the foregoing description it is to be understood that what has been disclosed herein represents an embodiment of the invention and is to be construed as illustrative rather than restrictive in nature and that the invention is best described by the following claims.

We claim:

1. A speed responsive control device for an automobile having means for producing an electrical speed signal of a frequency which is a direct function of the speed of the automobile and adapted to energize a load responsive to a predetermined frequency of said signal and to de-energize said load responsive to a lower predetermined frequency of said signal and comprising in combination: a first circuit channel for energizing said load and having a normally open switch adapted to be closed responsive to said predetermined frequency; means for maintaining said load energized upon subsequent opening of said first channel switch; a second circuit channel having a normally open switch adapted to be closed responsive to said lower frequency signal; and means connecting said second circuit channel to said maintaining means to de-energize the latter upon closure of said switch of said second channel responsive to said lower frequency signal.

2. The control device of claim 1 in which each circuit channel contains a normally open frequency bandpass switch device and an output terminal adapted to be connected to chassis ground by closure of said switch device.

3. The control device of claim 1 in which each circuit channel contains a normally open frequency bandpass switch device and an output terminal adapted to be connected to chassis ground by closure of said switch device and in which one of said normally open frequency bandpass switches is closable responsive to said signal of predetermined frequency and the other of said frequency bandpass switches is closable responsive to said signal of lower predetermined frequency.

4. The control device of claim 1 in which each circuit channel contains a normally open frequency bandpass switch device and an output terminal adapted to be connected to chassis ground by closure of said switch device and in which one of said normally open frequency bandpass switches is closable responsive to said signal of predetermined frequency and the other of said frequency bandpass switches is closable responsive to said signal of lower predetermined frequency and a normally non-conducting transistor comprising an emitter and a collector connected in series between a positive source of battery voltage and chassis ground and having a base connectable to ground through said normally open frequency bandpass switch device responsive to said signal of predetermined frequency.

5. The control device of claim 1 in which the means for maintaining said load energized upon subsequently opening of said first channel switch comprises a relay having opposed windings and two normally open contacts adapted to be closed upon energising of either of said windings, one of said contacts connecting to said load, the armature of said relay, said one contact and one of said windings being connected electrically in series between a source of positive voltage and chassis ground.

6. A speed responsive control device for an automobile having means for producing an electrical speed signal of a frequency which is a direct function of the speed of the automobile and adapted to energize a load responsive to a predetermined frequency of said signal and to de-energize said load responsive to a lower predetermined frequency of said signal and comprising in combination: a first circuit channel in the form of a normally open frequency bandpass switch device adapted to be closed electrically at said predetermined frequency; a normally non-conducting transistor comprising an emitter and a collector connected in series between a positive source of battery voltage and chassis ground and having a base connected to said normally open frequency bandpass switch; a first normally open circuit element for connecting said load between said positive source of voltage and chassis ground; means for closing said circuit element responsive to conduction of said transistor provided by closure of said bandpass switch; means for maintaining said load energized between said source and chassis ground upon opening of said frequency bandpass switch responsive to a frequency different from said predetermined frequency; a second circuit channel in the form of a normally open frequency bandpass switch device acapted to close responsive to said signal of lower frequency; a normally non-conducting circuit element for said second channel rendered conducting by closure of said second frequency bandpass switch device; and means connecting said second circuit element and de-energizing of the load responsive to said second frequency switch upon closure of the latter responsive to said lower frequency signal.

* * * * *

UNITED STATES PATENT OFFICE
CERTIFICATE OF CORRECTION

Patent No. 3,764,975    Dated October 9, 1973

Inventor(s) Rodney Hayden et al.

It is certified that error appears in the above-identified patent and that said Letters Patent are hereby corrected as shown below:

On the cover sheet insert:

[30] Foreign Application Priority Data

Dec. 2, 1971   Canada   129,096

Column 2, line 64, "devices 25,25" should read -- devices 24, 25 --.

Signed and sealed this 27th day of August 1974.

(SEAL)
Attest:

McCOY M. GIBSON, JR.           C. MARSHALL DANN
Attesting Officer              Commissioner of Patents